US010540450B2

United States Patent
Rottmann et al.

(10) Patent No.: US 10,540,450 B2
(45) Date of Patent: *Jan. 21, 2020

(54) PREDICTING FUTURE TRANSLATIONS (71) Applicant: Facebook, Inc., Menlo Park, CA (US)

(72) Inventors: Kay Rottmann, San Francisco, CA (US); Fei Huang, Boonton, NJ (US); Ying Zhang, Turlock, CA (US)

(73) Assignee: FACEBOOK, INC., Menlo Park, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 15/696,121

(22) Filed: Sep. 5, 2017

(65) Prior Publication Data

US 2018/0004734 A1 Jan. 4, 2018

Related U.S. Application Data (63) Continuation of application No. 15/654,668, filed on Jul. 19, 2017, which is a continuation of application
(Continued)

(51) Int. Cl.
*G06F 17/28* (2006.01)
*G06F 17/27* (2006.01)

(52) U.S. Cl.
CPC ........ *G06F 17/2854* (2013.01); *G06F 17/275* (2013.01); *G06F 17/289* (2013.01); *G06F 17/2809* (2013.01)

(58) Field of Classification Search
CPC .. G06F 17/28; G06F 17/2809; G06F 17/2818; G06F 17/2827; G06F 17/2836;
(Continued)

(56) References Cited

U.S. PATENT DOCUMENTS

| | | | |
|---|---|---|---|
| 5,293,581 | A | 3/1994 | DiMarco et al. |
| 5,477,451 | A | 12/1995 | Brown et al. |

(Continued)

OTHER PUBLICATIONS

Notice of Allowability dated Sep. 19, 2017 for U.S. Appl. No. 14/559,540 by Eck, M. et al. filed Dec. 3, 2014.

(Continued)

*Primary Examiner* — Lamont M Spooner (57) ABSTRACT

Technology is disclosed for snippet pre-translation and dynamic selection of translation systems. Pre-translation uses snippet attributes such as characteristics of a snippet author, snippet topics, snippet context, expected snippet viewers, etc., to predict how many translation requests for the snippet are likely to be received. An appropriate translator can be dynamically selected to produce a translation of a snippet either as a result of the snippet being selected for pre-translation or from another trigger, such as a user requesting a translation of the snippet. Different translators can generate high quality translations after a period of time or other translators can generate lower quality translations earlier. Dynamic selection of translators involves dynamically selecting machine or human translation, e.g., based on a quality of translation that is desired. Translations can be improved over time by employing better machine or human translators, such as when a snippet is identified as being more popular.

20 Claims, 6 Drawing Sheets

Related U.S. Application Data

No. 14/981,794, filed on Dec. 28, 2015, now Pat. No. 9,805,029, and a continuation of application No. 14/981,769, filed on Dec. 28, 2015, now Pat. No. 9,747,283.

(58) Field of Classification Search
CPC ............ G06F 17/2845; G06F 17/2854; G06F 17/2863; G06F 17/2872; G06F 17/289; G06F 17/2881
USPC .......................................................... 704/2–8
See application file for complete search history.

(56) References Cited

U.S. PATENT DOCUMENTS

| | | |
|---|---|---|
| 5,510,981 A | 4/1996 | Berger et al. |
| 5,799,193 A | 8/1998 | Sherman et al. |
| 5,991,710 A | 11/1999 | Papineni et al. |
| 6,002,998 A | 12/1999 | Martino et al. |
| 6,157,905 A | 12/2000 | Powell |
| 6,161,082 A | 12/2000 | Goldberg |
| 6,223,150 B1 | 4/2001 | Duan et al. |
| 6,266,642 B1 | 7/2001 | Franz et al. |
| 6,304,841 B1 | 10/2001 | Berger et al. |
| 6,377,925 B1 | 4/2002 | Newman et al. |
| 6,393,389 B1 | 5/2002 | Chanod et al. |
| 6,629,095 B1 | 9/2003 | Wagstaff et al. |
| 7,054,804 B2 | 5/2006 | Gonzales et al. |
| 7,110,938 B1 | 9/2006 | Cheng et al. |
| 7,359,861 B2 | 4/2008 | Lee et al. |
| 7,533,019 B1 | 5/2009 | Riccardi et al. |
| 7,664,629 B2 | 2/2010 | Dymetman et al. |
| 7,813,918 B2 | 10/2010 | Muslea et al. |
| 7,827,026 B2 | 11/2010 | Brun et al. |
| 7,895,030 B2 | 2/2011 | Al-Onaizan et al. |
| 7,983,903 B2 | 7/2011 | Gao et al. |
| 8,015,140 B2 | 9/2011 | Kumar et al. |
| 8,145,484 B2 | 3/2012 | Zweig et al. |
| 8,175,244 B1 | 5/2012 | Frankel et al. |
| 8,204,739 B2 | 6/2012 | Lane et al. |
| 8,209,333 B2 | 6/2012 | Hubbard et al. |
| 8,265,923 B2 | 9/2012 | Chatterjee et al. |
| 8,275,602 B2 | 9/2012 | Curry et al. |
| 8,386,235 B2 | 2/2013 | Duan et al. |
| 8,543,580 B2 | 9/2013 | Chen et al. |
| 8,756,050 B1 | 6/2014 | Curtis et al. |
| 8,825,466 B1 | 9/2014 | Wang et al. |
| 8,825,759 B1 | 9/2014 | Ho et al. |
| 8,831,928 B2 | 9/2014 | Marcu et al. |
| 8,838,434 B1 | 9/2014 | Liu |
| 8,874,429 B1 | 10/2014 | Crosley et al. |
| 8,897,423 B2 | 11/2014 | Nanjundaswamy |
| 8,935,150 B2 | 1/2015 | Christ |
| 8,942,973 B2 | 1/2015 | Viswanathan |
| 8,949,865 B1 | 2/2015 | Murugesan et al. |
| 8,983,974 B1 | 3/2015 | Ho et al. |
| 8,990,068 B2 | 3/2015 | Orsini et al. |
| 8,996,352 B2 | 3/2015 | Orsini et al. |
| 8,996,353 B2 | 3/2015 | Orsini et al. |
| 8,996,355 B2 | 3/2015 | Orsini et al. |
| 9,009,025 B1 | 4/2015 | Porter et al. |
| 9,031,829 B2 | 5/2015 | Leydon et al. |
| 9,104,661 B1 | 8/2015 | Evans |
| 9,183,309 B2 | 11/2015 | Gupta |
| 9,231,898 B2 | 1/2016 | Orsini et al. |
| 9,245,278 B2 | 1/2016 | Orsini et al. |
| 9,336,206 B1 | 5/2016 | Orsini et al. |
| 9,477,652 B2 | 10/2016 | Huang et al. |
| 9,734,142 B2 | 8/2017 | Huang et al. |
| 9,734,143 B2 | 8/2017 | Rottmann et al. |
| 9,740,687 B2 | 8/2017 | Herdagdelen et al. |
| 9,747,283 B2 | 8/2017 | Rottmann et al. |
| 9,805,029 B2 | 10/2017 | Rottmann et al. |
| 9,830,386 B2 | 11/2017 | Huang et al. |
| 9,830,404 B2 | 11/2017 | Huang et al. |
| 2002/0087301 A1 | 7/2002 | Jones et al. |
| 2002/0161579 A1 | 10/2002 | Saindon et al. |
| 2002/0169592 A1 | 11/2002 | Aityan |
| 2003/0040900 A1 | 2/2003 | D'Agostini et al. |
| 2004/0002848 A1 | 1/2004 | Zhou et al. |
| 2004/0049374 A1 | 3/2004 | Breslau et al. |
| 2004/0098247 A1 | 5/2004 | Moore |
| 2004/0122656 A1 | 6/2004 | Abir |
| 2004/0243392 A1 | 12/2004 | Chino et al. |
| 2005/0021323 A1 | 1/2005 | Li et al. |
| 2005/0055630 A1 | 3/2005 | Scanlan et al. |
| 2005/0228640 A1 | 10/2005 | Aue et al. |
| 2006/0111891 A1 | 5/2006 | Menezes et al. |
| 2006/0206798 A1 | 9/2006 | Kohlmeier et al. |
| 2006/0271352 A1 | 11/2006 | Nikitin et al. |
| 2007/0130563 A1 | 6/2007 | Elgazzar et al. |
| 2007/0136222 A1 | 6/2007 | Horvitz et al. |
| 2008/0046231 A1 | 2/2008 | Laden et al. |
| 2008/0077384 A1 | 3/2008 | Agapi et al. |
| 2008/0281578 A1 | 11/2008 | Kumaran et al. |
| 2009/0070095 A1 | 3/2009 | Gao et al. |
| 2009/0083023 A1 | 3/2009 | Foster et al. |
| 2009/0132233 A1 | 5/2009 | Etzioni et al. |
| 2009/0182547 A1 | 7/2009 | Niu et al. |
| 2009/0198487 A1 | 8/2009 | Wong et al. |
| 2009/0210214 A1 | 8/2009 | Qian et al. |
| 2009/0276206 A1 | 11/2009 | Fitzpatrick et al. |
| 2009/0281789 A1 | 11/2009 | Waibel et al. |
| 2009/0326912 A1 | 12/2009 | Ueffing et al. |
| 2010/0042928 A1 | 2/2010 | Rinearson et al. |
| 2010/0121639 A1 | 5/2010 | Zweig et al. |
| 2010/0161642 A1 | 6/2010 | Chen et al. |
| 2010/0179803 A1 | 7/2010 | Sawaf et al. |
| 2010/0194979 A1 | 8/2010 | Blumenschein et al. |
| 2010/0223048 A1 | 9/2010 | Lauder et al. |
| 2010/0228777 A1 | 9/2010 | Imig et al. |
| 2010/0241416 A1 | 9/2010 | Jiang et al. |
| 2010/0283829 A1 | 11/2010 | De Beer et al. |
| 2010/0299132 A1 | 11/2010 | Dolan et al. |
| 2011/0099000 A1 | 4/2011 | Rai et al. |
| 2011/0137636 A1 | 6/2011 | Srihari et al. |
| 2011/0246172 A1 | 10/2011 | Liberman et al. |
| 2011/0246881 A1 | 10/2011 | Kushman et al. |
| 2011/0252027 A1 | 10/2011 | Chen et al. |
| 2011/0282648 A1 | 11/2011 | Sarikaya et al. |
| 2012/0005224 A1 | 1/2012 | Ahrens et al. |
| 2012/0029910 A1 | 2/2012 | Medlock et al. |
| 2012/0035907 A1 | 2/2012 | Lebeau et al. |
| 2012/0035915 A1 | 2/2012 | Kitade et al. |
| 2012/0047172 A1 | 2/2012 | Ponte et al. |
| 2012/0059653 A1 | 3/2012 | Adams et al. |
| 2012/0101804 A1 | 4/2012 | Roth et al. |
| 2012/0109649 A1 | 5/2012 | Talwar et al. |
| 2012/0123765 A1 | 5/2012 | Estelle et al. |
| 2012/0130940 A1 | 5/2012 | Gattani et al. |
| 2012/0138211 A1 | 6/2012 | Barger et al. |
| 2012/0158621 A1 | 6/2012 | Bennett et al. |
| 2012/0173224 A1 | 7/2012 | Anisimovich et al. |
| 2012/0209588 A1 | 8/2012 | Wu et al. |
| 2012/0253785 A1 | 10/2012 | Hamid et al. |
| 2012/0330643 A1 | 12/2012 | Frei et al. |
| 2013/0018650 A1 | 1/2013 | Moore et al. |
| 2013/0060769 A1 | 3/2013 | Pereg et al. |
| 2013/0084976 A1 | 4/2013 | Kumaran et al. |
| 2013/0103384 A1 | 4/2013 | Hunter et al. |
| 2013/0144595 A1 | 6/2013 | Lord et al. |
| 2013/0144603 A1 | 6/2013 | Lord et al. |
| 2013/0144619 A1 | 6/2013 | Lord et al. |
| 2013/0151231 A1* | 6/2013 | Giraudy .................. G06F 17/28 704/2 |
| 2013/0173247 A1 | 7/2013 | Hodson et al. |
| 2013/0246063 A1 | 9/2013 | Teller et al. |
| 2013/0317808 A1 | 11/2013 | Kruel et al. |
| 2014/0006003 A1 | 1/2014 | Soricut et al. |
| 2014/0006929 A1 | 1/2014 | Swartz et al. |
| 2014/0012568 A1 | 1/2014 | Caskey et al. |
| 2014/0025734 A1 | 1/2014 | Griffin et al. |
| 2014/0059030 A1 | 2/2014 | Hakkani-Tur et al. |
| 2014/0081619 A1 | 3/2014 | Solntseva et al. |

(56) References Cited

U.S. PATENT DOCUMENTS

| | | |
|---|---|---|
| 2014/0108393 A1 | 4/2014 | Angwin et al. |
| 2014/0163977 A1 | 6/2014 | Hoffmeister et al. |
| 2014/0172413 A1 | 6/2014 | Cvijetic et al. |
| 2014/0195884 A1 | 7/2014 | Castelli et al. |
| 2014/0207439 A1 | 7/2014 | Venkatapathy et al. |
| 2014/0229155 A1 | 8/2014 | Leydon et al. |
| 2014/0279996 A1 | 9/2014 | Teevan et al. |
| 2014/0280295 A1 | 9/2014 | Kurochkin et al. |
| 2014/0280592 A1 | 9/2014 | Zafarani et al. |
| 2014/0288913 A1 | 9/2014 | Shen et al. |
| 2014/0288917 A1 | 9/2014 | Orsini et al. |
| 2014/0288918 A1 | 9/2014 | Orsini et al. |
| 2014/0303960 A1 | 10/2014 | Orsini et al. |
| 2014/0335483 A1 | 11/2014 | Buryak et al. |
| 2014/0337007 A1 | 11/2014 | Fuegen et al. |
| 2014/0337989 A1 | 11/2014 | Bojja et al. |
| 2014/0350916 A1 | 11/2014 | Jagpal et al. |
| 2014/0358519 A1 | 12/2014 | Dymetman et al. |
| 2014/0365200 A1 | 12/2014 | Sagie |
| 2014/0365460 A1 | 12/2014 | Portnoy et al. |
| 2015/0006143 A1 | 1/2015 | Skiba et al. |
| 2015/0006219 A1 | 1/2015 | Jose et al. |
| 2015/0033116 A1 | 1/2015 | Severdia et al. |
| 2015/0046146 A1 | 2/2015 | Crosley et al. |
| 2015/0066805 A1 | 3/2015 | Taira et al. |
| 2015/0120290 A1 | 4/2015 | Shagalov |
| 2015/0134322 A1 | 5/2015 | Cuthbert et al. |
| 2015/0142420 A1 | 5/2015 | Sarikaya et al. |
| 2015/0161104 A1 | 6/2015 | Buryak et al. |
| 2015/0161110 A1 | 6/2015 | Salz |
| 2015/0161112 A1 | 6/2015 | Galvez et al. |
| 2015/0161114 A1 | 6/2015 | Buryak et al. |
| 2015/0161115 A1 | 6/2015 | Denero et al. |
| 2015/0161227 A1 | 6/2015 | Buryak et al. |
| 2015/0213008 A1 | 7/2015 | Orsini et al. |
| 2015/0228279 A1 | 8/2015 | Moreno et al. |
| 2015/0293997 A1 | 10/2015 | Smith et al. |
| 2015/0363388 A1 | 12/2015 | Green et al. |
| 2016/0041986 A1 | 2/2016 | Nguyen |
| 2016/0048505 A1 | 2/2016 | Tian et al. |
| 2016/0092603 A1 | 3/2016 | Rezaei et al. |
| 2016/0117628 A1 | 4/2016 | Brophy et al. |
| 2016/0162473 A1 | 6/2016 | Hedley et al. |
| 2016/0162477 A1 | 6/2016 | Orsini et al. |
| 2016/0162478 A1 | 6/2016 | Blassin et al. |
| 2016/0162575 A1 | 6/2016 | Eck et al. |
| 2016/0188575 A1 | 6/2016 | Sawaf |
| 2016/0188576 A1 | 6/2016 | Huang et al. |
| 2016/0188661 A1 | 6/2016 | Zhang et al. |
| 2016/0188703 A1 | 6/2016 | Zhang et al. |
| 2016/0217124 A1 | 7/2016 | Sarikaya et al. |
| 2016/0239476 A1 | 8/2016 | Huang et al. |
| 2016/0267073 A1 | 9/2016 | Noeman et al. |
| 2016/0299884 A1 | 10/2016 | Chioasca et al. |
| 2016/0357519 A1 | 12/2016 | Vargas et al. |
| 2017/0011739 A1 | 1/2017 | Huang et al. |
| 2017/0083504 A1 | 3/2017 | Huang |
| 2017/0169015 A1 | 6/2017 | Huang |
| 2017/0177564 A1 | 6/2017 | Rottmann et al. |
| 2017/0185583 A1 | 6/2017 | Pino et al. |
| 2017/0185586 A1 | 6/2017 | Rottmann |
| 2017/0185588 A1 | 6/2017 | Rottmann et al. |
| 2017/0270102 A1 | 9/2017 | Herdagdelen et al. |
| 2017/0315988 A1 | 11/2017 | Herdagdelen et al. |
| 2017/0315991 A1 | 11/2017 | Rottmann et al. |

OTHER PUBLICATIONS

Notice of Allowance dated Oct. 10, 2017 for U.S. Appl. No. 15/275,235 for Huang, F. et al., filed Sep. 23, 2016.
Notice of Allowance dated Oct. 23, 2017 for U.S. Appl. No. 15/445,978 of Herdagdelen, A. filed Feb. 28, 2017.
Taylor, S. et al. "Forecasting at Scale" Jan. 2017, retrieved from https://facebookincubator.github.io/prophet/static/prophet_paper_20170113.pdf.
U.S. Appl. No. 15/723,095 of Tiwari, P. filed Oct. 2, 2017.
Corrected Notice of Allowability dated Nov. 17, 2017, for U.S. Appl. No. 14/559,540 of Eck, M. et al., filed Dec. 3, 2014.
Notice of Allowance dated Dec. 8, 2017 for U.S. Appl. No. 15/652,175 by Herdagdelen, A., filed Jul. 17, 2017.
Corrected Notice of Allowability dated Dec. 12, 2017, for U.S. Appl. No. 14/559,540 of Eck, M. et al., filed Dec. 3, 2014.
U.S. Appl. No. 15/820,351 by Huang et al., filed Nov. 21, 2017.
U.S. Appl. No. 15/821,167 by Huang et al., filed Nov. 22, 2017.
Corrected Notice of Allowability dated Jul. 13, 2017, for U.S. Appl. No. 14/973,387 of Rottmann, K., et al., filed Dec. 17, 2015.
Extended European Search Report for European Application No. 16161095.1, dated Feb. 16, 2017, 4 pages.
Final Office Action dated Aug. 10, 2017 for U.S. Appl. No. 15/275,235 by Huang, F. et al. filed Sep. 23, 2016.
Final Office Action dated Aug. 25, 2017 for U.S. Appl. No. 14/980,654 by Pino, J. et al., filed Dec. 28, 2015.
Final Office Action dated Jul. 1, 2016, for U.S. Appl. No. 14/302,032 of Herdagdelen, A., filed Jun. 11, 2014.
Final Office Action dated Jun. 16, 2017, for U.S. Appl. No. 14/586,022 of Huang, F. et al., filed Dec. 30, 2014.
International Search Report and Written Opinion for International Application No. PCT/US2015/051737, dated Jul. 28, 2016, 22 pages.
Koehn, P. et al., "Statistical Phrase-Based Translation," Proceedings of the 2003 Conference of the North American Chapter of the Association for computational Linguistics on Human Language Technology—vol. 1, Assoc. For Computational Linguistics, 2003, p.
Non-Final Office Action dated Aug. 25, 2017 for U.S. Appl. No. 15/652,175 by Herdagdelen, A., filed Jul. 17, 2017.
Non-Final Office Action dated Aug. 29, 2017 for U.S. Appl. No. 14/967,897 by Huang, F., filed Dec. 14, 2015.
Non-Final Office Action dated Dec. 17, 2015, for U.S. Appl. No. 14/302,032 of Saint Cyr, L., filed Jun. 11, 2014.
Non-Final Office Action dated Dec. 21, 2016, for U.S. Appl. No. 14/586,022 of Huang, F., filed Dec. 30, 2014.
Non-Final Office Action dated Dec. 29, 2016, for U.S. Appl. No. 14/586,049 of Huang, F. et al., filed Dec. 30, 2014.
Non-Final Office Action dated Dec. 30, 2016 in U.S. Appl. No. 14/586,074 by Huang, F. et al., filed Dec. 30, 2014.
Non-Final Office Action dated Feb. 9, 2017, for U.S. Appl. No. 14/559,540 of Eck, M. et al., filed Dec. 3, 2014.
Non-Final Office Action dated Jan. 12, 2017, for U.S. Appl. No. 15/275,235 of Huang, F. et al., filed Sep. 23, 2016.
Non-Final Office Action dated Jan. 19, 2017, for U.S. Appl. No. 14/980,654 of Pino, J. et al., filed Dec. 28, 2015.
Non-Final Office Action dated Jul. 28, 2016, for U.S. Appl. No. 14/861,747 of F. Huang, filed Sep. 22, 2015.
Non-Final Office Action dated Jun. 26, 2017 for U.S. Appl. No. 15/445,978 of Amac Herdagdelen, filed Feb. 28, 2017.
Non-Final Office Action dated Mar. 10, 2016, for U.S. Appl. No. 14/621,921 of Huang, F., filed Feb. 13, 2015.
Non-Final Office Action dated Nov. 9, 2016, for U.S. Appl. No. 14/973,387 by Rottmann, K., et al., filed Dec. 17, 2015.
Non-Final Office Action dated Oct. 26, 2015, for U.S. Appl. No. 14/861,747 of F. Huang, filed Sep. 22, 2015.
Non-Final Office Action dated Oct. 6, 2016, U.S. Appl. No. 14/981,794 of Rottmann, K. filed Dec. 28, 2015.
Notice of Allowance dated Apr. 13, 2017, for U.S. Appl. No. 14/973,387 of Rottmann, K., et al., filed Dec. 17, 2015.
Notice of Allowance dated Apr. 19, 2017, for U.S. Appl. No. 14/981,769 by Rottmann, K., et al., filed Dec. 28, 2015.
Notice of Allowance dated Apr. 20, 2017, for U.S. Appl. No. 14/302,032 by Herdagdelen, A., et al., filed Jun. 11, 2014.
Notice of Allowance dated Apr. 7, 2017 for U.S. Appl. No. 14/861,747 by Huang, F., et al., filed Sep. 22, 2015.
Notice of Allowance dated Aug. 30, 2017 for U.S. Appl. No. 14/559,540 by Eck, M. et al. filed Dec. 3, 2014.
Notice of Allowance dated Aug. 4, 2017, for U.S. Appl. No. 14/981,794 by Rottman, K., et al., filed Dec. 28, 2015.

(56) References Cited

OTHER PUBLICATIONS

Notice of Allowance dated Jul. 12, 2017, for U.S. Appl. No. 14/981,794 by Rottman, K., et al., filed Dec. 28, 2015.
Notice of Allowance dated Jul. 18, 2016, for U.S. Appl. No. 14/621,921 of Huang, F., filed Feb. 13, 2015.
Notice of Allowance dated Jul. 26, 2017, for U.S. Appl. No. 14/586,074 by Huang, F., et al., filed Dec. 30, 2014.
Notice of Allowance dated Jul. 28, 2017, for U.S. Appl. No. 14/586,049 by Huang, F., et al., filed Dec. 30, 2014.
Notice of Allowance dated Jun. 6, 2017, for U.S. Appl. No. 14/981,794 by Rottman, K., et al., filed Dec. 28, 2015.
Notice of Allowance dated Mar. 1, 2017, for U.S. Appl. No. 14/981,769 by Rottmann, K., et al., filed Dec. 28, 2015.
Notice of Allowance dated Nov. 30, 2016, for U.S. Appl. No. 14/302,032 of Herdagdelen, A., filed Jun. 11, 2014.
Supplemental Notice of Allowability dated Jul. 13, 2017, for U.S. Appl. No. 14/981,769 by Rottmann, K., et al., filed Dec. 28, 2015.
Sutskever, I., et al., "Sequence to sequence learning with neural networks," Advances in Neural Information Processing Systems, pp. 3104-3112, 2014.
U.S. Appl. No. 14/302,032 of Herdagdelen, A et al., filed Jun. 11, 2014.
U.S. Appl. No. 14/559,540 of Eck, M et al., filed Dec. 3, 2014.
U.S. Appl. No. 14/586,022 of Huang, F. et al., filed Dec. 30, 2014.
U.S. Appl. No. 14/586,049, by Huang et al., filed Dec. 30, 2014.
U.S. Appl. No. 14/586,074 by Huang et al., filed Dec. 30, 2014.
U.S. Appl. No. 14/621,921 of Huang, F., filed Feb. 13, 2015.
U.S. Appl. No. 14/861,747 by Huang, F., filed Sep. 22, 2015.
U.S. Appl. No. 14/967,897 of Huang F. et al., filed Dec. 14, 2015.
U.S. Appl. No. 14/973,387, of Rottmann, K., et al., filed Dec. 17, 2015.
U.S. Appl. No. 14/980,654 of Pino, J. et al., filed Dec. 28, 2015.
U.S. Appl. No. 14/981,769 by Rottmann, K., et al., filed Dec. 28, 2015.
U.S. Appl. No. 14/981,794 by Rottmann, K., et al., filed Dec. 28, 2015.
U.S. Appl. No. 15/199,890 of Zhang, Y. et al., filed Jun. 30, 2016.
U.S. Appl. No. 15/244,179 of Zhang, Y., et al., filed Aug. 23, 2016.
U.S. Appl. No. 15/275,235 of Huang, F. et al., filed Sep. 23, 2016.
U.S. Appl. No. 15/422,463 of Merl, D., et al., filed Feb. 2, 2017.
U.S. Appl. No. 15/445,978 by Herdagdelen, A., et al., filed Feb. 28, 2017.
U.S. Appl. No. 15/644,690 of Huang, F., et al., filed Jul. 7, 2017.
U.S. Appl. No. 15/652,144 of Rottmann, K., filed Jul. 17, 2017.
U.S. Appl. No. 15/654,668 of Rottmann, K., filed Jul. 19, 2017.
U.S. Appl. No. 15/672,690 of Huang, F., filed Aug. 9, 2017.
Vogel, S. et al., "HMM-Based Word Alignment in Statistical Translation." In Proceedings of the 16th Conference on Computational Linguistics—vol. 2, Association for Computational Linguistics, 1996, pp. 836-841.
Zamora, J.D., et al., "Tweets language identification using feature weightings," Proceedings of the Twitter language identification workshop, Sep. 16, 2017, 5 pages.
Final Office Action dated Sep. 8, 2017 for U.S. Appl. No. 15/445,978 of Herdagdelen, A. filed Feb. 28, 2017.
Notice of Allowability dated Sep. 12, 2017 for U.S. Appl. No. 14/981,794 by Rottman, K., et al., filed Dec. 28, 2015.

\* cited by examiner

PREDICTING FUTURE TRANSLATIONS

CROSS-REFERENCES TO RELATED APPLICATIONS

This application is a continuation of U.S. patent application Ser. No. 15/654,668, filed on Jul. 19, 2017, and entitled "PREDICTING FUTURE TRANSLATIONS"; which is a continuation of U.S. patent application Ser. No. 14/981,769, filed on Dec. 28, 2015, and entitled "PREDICTING FUTURE TRANSLATIONS"; and is also a continuation of U.S. patent application Ser. No. 14/981,794, filed on Dec. 28, 2015, and entitled "PREDICTING FUTURE TRANSLATIONS"; the disclosures of which are hereby incorporated herein in their entireties by reference.

BACKGROUND

The Internet has made it possible for people to connect and share information globally in ways previously undreamt of. Social media platforms, for example, enable people on opposite sides of the world to collaborate on ideas, discuss current events, or simply share what they had for lunch. The amount of content generated through such social media technologies and the load on these systems are staggering. It is common for social media providers to operate databases with petabytes of media items, while leading providers are already looking toward technology to handle exabytes of data. Furthermore, millions of users across the globe enjoy the ability to simultaneously interact with content on social media websites. One popular social media website, for example, has over a billion active users that spend a total of over ten million hours each month interacting with the website. These users can often produce hundreds of millions of content posts each day. When users access such websites, the social media website can select content such as other users' posts, news feeds, event notifications, and advertisements to display to the users.

Despite this complexity, the transition from one page to the next within a social networking website appears simple to end users, and unless this page retrieval process occurs with no perceptible delays, users may lose patience and simply navigate to a different website. In addition, providing content that users find relevant increases the chances that users will interact with those content items and that they will return to the website in the future. For example, being able provide quick and accurate translations of content originally written in a different source language increases users access to both content and other users, and thus their overall enjoyment of a social media system.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Translation technology for selecting language snippets to pre-translate based on translation requirements and for selecting processes for performing translations based on when the translation will be needed are described herein. Selecting language snippets to pre-translate and selecting methods of translation can improve the speed and quality of translations while decreasing the cost. For example, in a social media website that performs millions of translations per day, the disclosed translation technology can improve the response time for translation requests by predicting that translation requests will occur and having translation content already prepared. Furthermore, translation requests that are predicted ahead of time can be performed at less costly off-peak times. In addition, a translation that is identified as not being needed immediately can be translated using slower but more accurate techniques.

A "language snippet" or "snippet," as used herein, is a digital representation including one or more words or character groups. A snippet can be a representation of a content item or language from a content item (e.g., one or more images, videos, or audio files), language from or associated with a content item, or any other context or metadata associated with the content item (e.g., object, location, or person identification; image, video, or audio characteristics; structured data provided by an originator of the content item; or any other information associated with the content item). While the description below refers to snippets when performing natural language processing on content items, other language formats can be used, such as audio or video language representations.

Pre-translation of a snippet can include translating the snippet from a source language into one or more output languages prior to an actual request for the translation. Such pre-translations can occur, for example, at the time the snippet is created or when the snippet is identified as likely to be translated a threshold amount. Additional details regarding selecting snippets for pre-translation are provided below in relation to FIG. 4. When determining which snippets to pre-translate, a pre-translation system can assign a score to a snippet based on translation likelihood factors such as popularity, a likely audience, length, characteristics of an author of the snippet, etc. Additional details regarding computing pre-translation scores for a snippet are provided below in relation to FIG. 5.

Once a snippet has been selected for translation, a translation system can examine expected time factors to select a method of translation that balances quality and timeliness. The translation system can examine time factors that indicate when, if, and how frequently translation requests for a snippet are likely to occur. The translation system can compare these factors to the processing requirements of various translation methods to select a method to use in translating the snippet. As these conditions change, such as when the end of a likely time period is approaching or a content item's popularity increases, this analysis can be recomputed to determine whether to re-translate the content item with a higher accuracy translation method. Additional details regarding selecting translation methods are provided below in relation to FIG. 6.

Figure 1:
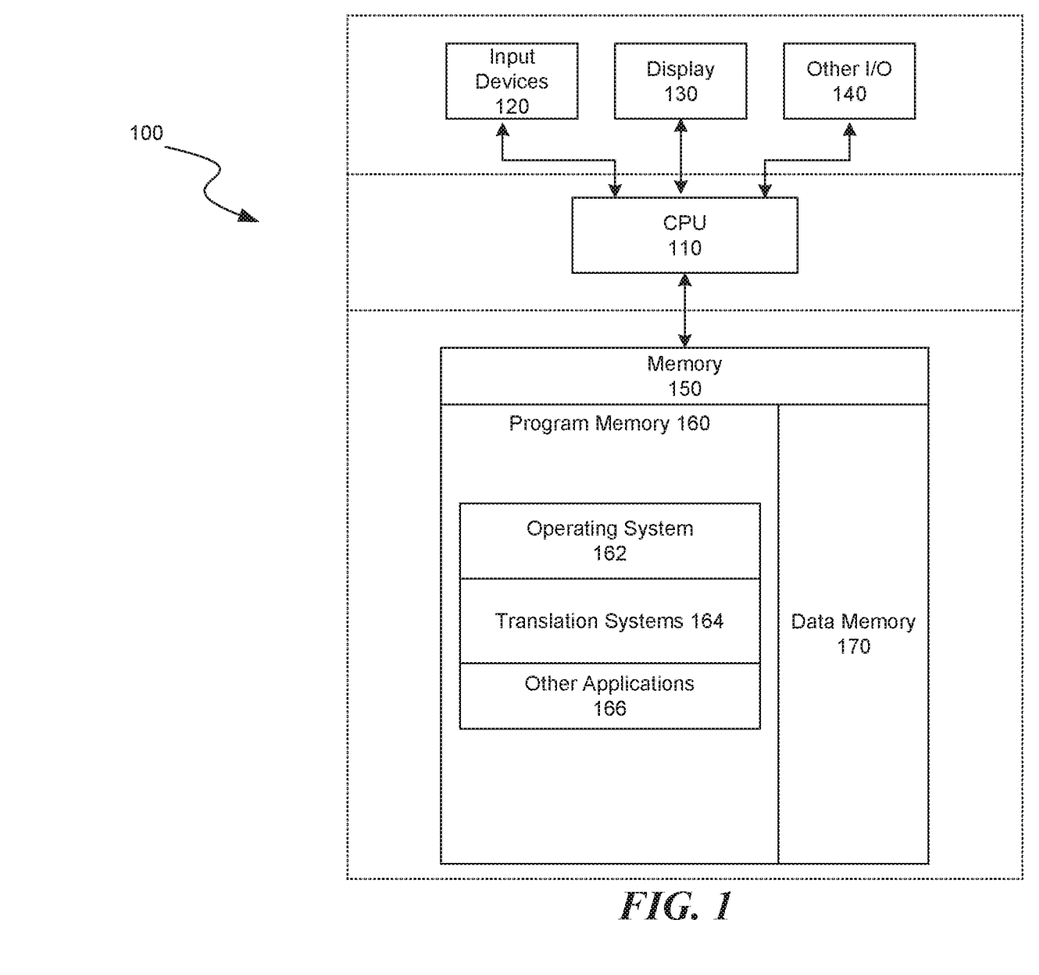
FIG. 1 is a block diagram illustrating an overview of devices on which some implementations of the disclosed technology can operate.

Several implementations of the described technology are discussed below in more detail in reference to the figures. Turning now to the figures, FIG. 1 is a block diagram illustrating an overview of devices 100 on which some implementations of the disclosed technology may operate. The devices can comprise hardware components of a device 100 that can determine whether a pre-translation of a snippet should be performed or how snippet translations are to be performed. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, translation systems 164, or other application programs 166. Memory 150 can also include data memory 170 that can include snippets, threshold values, translation engines, score weighting factors, timing factors, configuration data, settings, user options or preferences, etc. which can be provided to the program memory 160 or any element of the device 100.

The disclosed technology can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
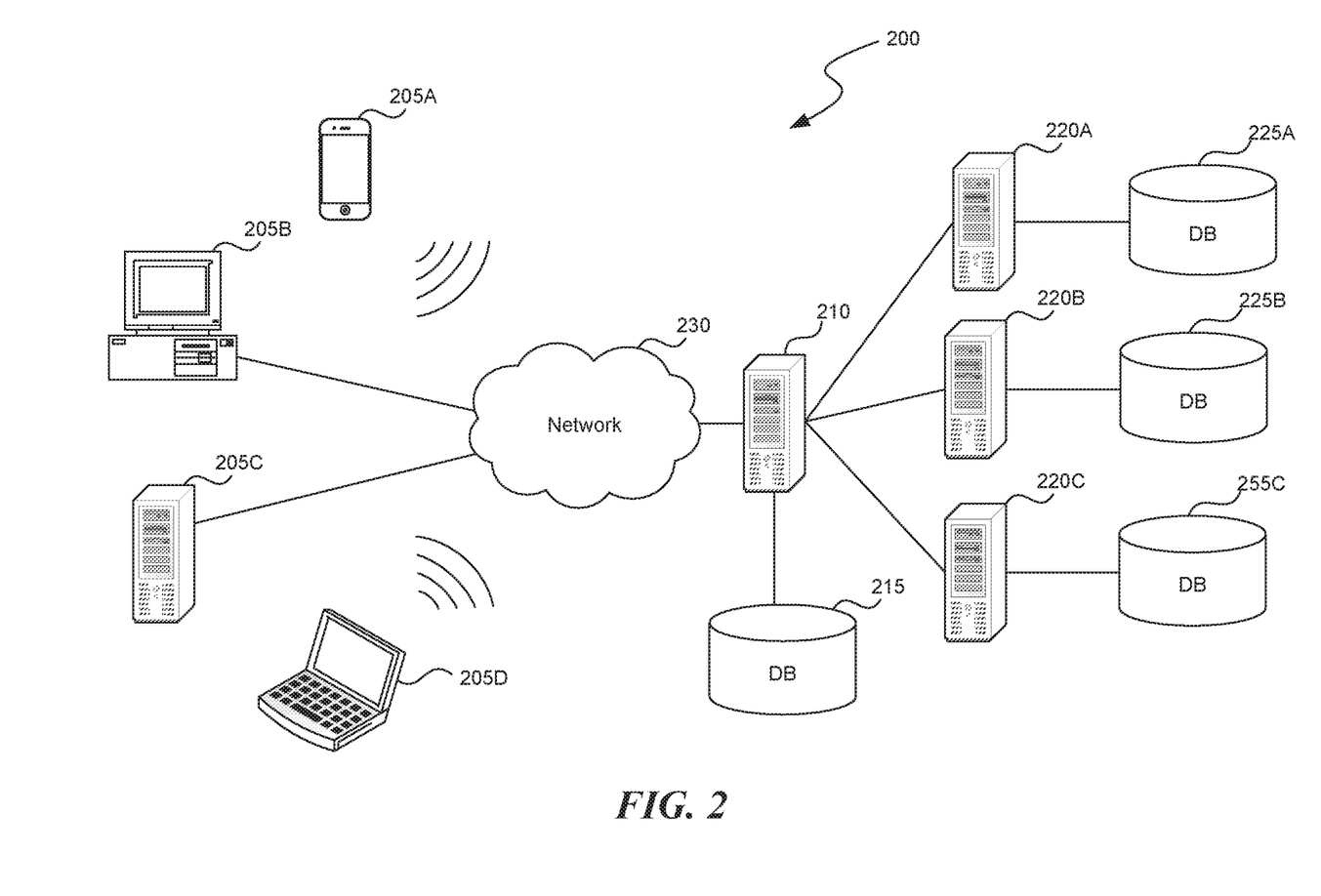
FIG. 2 is a block diagram illustrating an overview of an environment in which some implementations of the disclosed technology can operate.

FIG. 2 is a block diagram illustrating an overview of an environment 200 in which some implementations of the disclosed technology may operate. Environment 200 can include one or more client computing devices 205A-D, examples of which can include device 100. Client computing devices 205 can operate in a networked environment using logical connections 210 through network 230 to one or more remote computers such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as snippets, threshold values, translation engines, score weighting factors, timing factors, configuration data, settings, user options or preferences, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
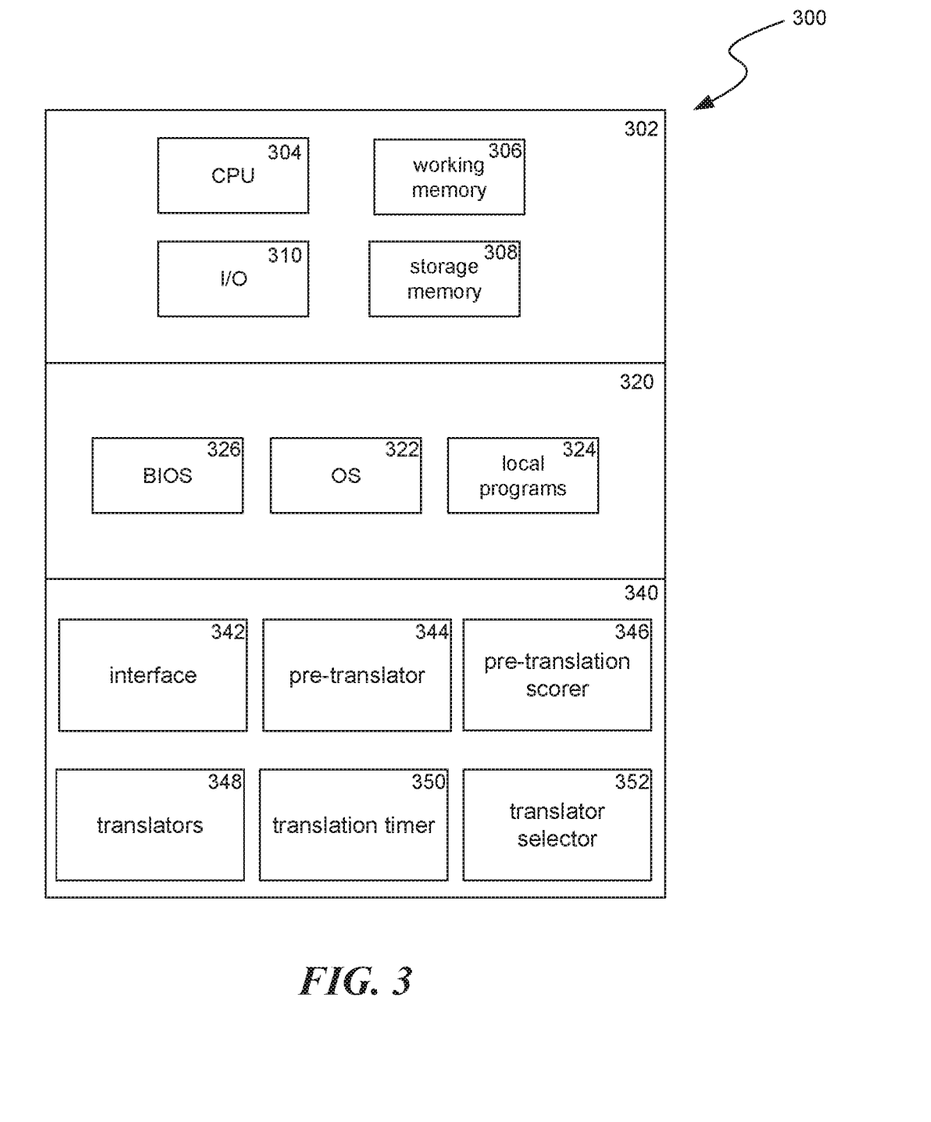
FIG. 3 is a block diagram illustrating components which, in some implementations, can be used in a system employing the disclosed technology.

FIG. 3 is a block diagram illustrating components 300 which, in some implementations, can be used in a system implementing the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a BIOS 326. Specialized components 340 can be subcomponents of a general software application 320, such as local programs 324. Specialized components 340 can include pre-translator 344, pre-translation scorer 346, translators 348, translation timer 350, translator selector 352, and components which can be used for transferring data and controlling the specialized components, such as interface 342. In some implementations, components 300 can be in a computing system that is distributed across multiple computing devices or can include an interface to a server-based application.

Pre-translator 344 can be configured to receive snippets which may need to be pre-translated, such as through interface 342. Pre-translator 344 can obtain a score for receive snippets, such as using pre-translation scorer 346. In some implementations, multiple scores can be obtained for a snippet corresponding to multiple possible output languages or possible users. When one of these scores is above a threshold value, indicating the likelihood of a request for a translation of the snippet, or a number of requests for translations of the snippet, is sufficiently high, pre-translator 344 can obtain one or more translations of the snippet, such as by using translators 348. The obtained pre-translation can be returned through interface 342.

Pre-translation scorer 346 can be configured to determine translation likelihood factors for a received snippet and compute one or more scores based on the translation likelihood factors. In various implementations, the translation likelihood factors can include one or more of: characteristics identified for an author of the snippet, one of more topics identified in the snippet, a likely audience of the snippet, users who have engaged with the snippet thus far, snippet length, snippet source language, snippet rating, a likely amount of time before a translation of the snippet is needed, or any combination thereof.

In some implementations, characteristics identified for an author of the snippet can include one or more of: a language an author is identified as being facile with, an author's age, an author's gender, a location associated with an author, an occupation of an author, an education level of an author, a number of friends of an author, friends of an author who speak a language other than the language spoken by the author, etc. In some implementations, posts with specified topics can be selected for pre-translation based on those topics being identified as generally popular, popular within a particular geographic area or language speaking group, popular within a particular age range of users, etc. In some implementations, a likely audience of the snippet can be determined based on a historical audience for: snippets with the same or similar author, snippets with similar topics, snippets created for a similar virtual location, etc. In some implementations, factors relating to users who have engaged with the snippet thus far can include a total number of users who have viewed the snippet, a total number of translation requests for the snippet, an amount of time the snippet has been viewable, a number of interactions with the snippet such as "likes" or "follows," particular users viewing or otherwise interacting with the snippet who have been identified as predictive of future trends or trend setters, etc. In some implementations, a user can "like" a content item including one or more snippets by actuating a control associated with the content item.

In some implementations, a snippet rating can be based on where in a list of comments the snippet will, or is likely, to appear, which can be determined for particular users or for users generally. In some implementations, a likely amount of time before a translation is needed can be based on factors such as when users who are likely to request a translation of the snippet are likely to interact with a system that provides translations of the snippet. For example, a social media website can determine that a snippet is likely to be translated into German. That social media website can also determine that most users who speak German access that social media website during a particular timeframe when Germanic countries are awake. In this example, the timing translation factor can be low when a current time is relatively far from the time users in Germanic countries are likely to access the social media website, i.e., pre-translation is not immediately needed. Additional details regarding computing timing factors for a snippet are given below in relation to translation timer 350.

In some implementations, pre-translation scorer 346 can score a snippet multiple times as factors affecting the snippet's score(s) change. For example, as different topics are identified as popular or "trending," or as the time draws closer to when translations of a snippet are expected to be needed, scores indicating whether a pre-translation of the snippet should be performed can be recomputed.

Translators 348 can be configured to provide a translation of a snippet. Translators 348 can include various machine translation engines or interfaces for human translators to perform a translation of a snippet. In some implementations, translators 348 can be associated with quality values indicating reliability of a translator at producing a translation of a snippet from a source language to an output language. In some implementations, the quality of a translation produced by a translator is inversely proportional to an amount of time required for the translation to be performed. In some implementations, human translators provide the highest quality translations and multiple human translators can have different quality ratings or can have different quality ratings based on an area or topic of specialty of that human translator. Multiple machine translation engines can be included in translators 348 that perform different amounts of processing and different methods of processing on a snippet to produce different quality translations.

In some implementations, translators 348 can be associated with timing values. In various implementations, these timing values can indicate an expected amount of time a corresponding translator will take to perform a translation of a snippet or a speed with which the corresponding translator is expected to perform translations. This timing value can indicate how long it can take to translate an average sized snippet with the corresponding translator or can be a value indicating how long the translator can take to translate a portion of a snippet, such as a single word or the average per-character translation time, which can be multiplied by the number of words or characters in a snippet. Timing values can be based on a record of translations performed by a particular translator, such as by benchmarking tests for a machine translation engine or typical translation times for a human translator. These values can also be set by a human, such as when a human translator provides translation time estimates or guarantees.

Translation timer 350 can be configured to compute an amount of time before a translation of a snippet is needed. This amount can be an estimated amount of time before a first translation of the snippet is requested, an estimated amount of time before a peak number of translations are requested, or an established amount of time before a threshold amount or frequency of translations are requested. This amount of time value can be based on a determination of a likely audience of a snippet. This amount of time value can also be based on languages associated with the likely audience, geographical locations of the likely audience, typical login times identified for a particular audience, etc.

Translator selector 352 can be configured to select one of translators 348 to perform a translation of a snippet received through interface 342. In some implementations, translator selector 352 can accomplish this by determining whether a human or machine translation will be performed. This determination can be based on a comparison between an amount of time value provided by translation timer 350 and performance metrics associated with various of translators 348 to determine whether there is sufficient time available for a human translation of the snippet. In addition, in some implementations, this determination can be based on a score for the snippet determined by pre-translation scorer 346 indicating whether the need for translations of the snippet justifies the cost of performing human translation of the snippet. If translator selector 352 determines that the snippet should be sent to a human translator this can be accomplished using one of the translators of 348 as an interface to the human translator. The individual human translator can be selected by choosing a translator that, based on a corresponding timing value, can perform the translation before the time value provided by translation timer 350 expires. This choosing can also be based on specialties identified for particular human translators, such as by matching snippets with a particular topic or in a particular area to a translator specialized in that topic or area.

If translator selector 352 determines that the snippet should be translated with a machine translator of translators 348, a machine translator engine can be chosen based on the machine translator engine performance metrics (i.e., timing and quality scores). This choosing can include a comparison between an amount of time value provided by translation timer 350 and timing values associated with various machine translation engines. In some implementations, this choosing can be performed by balancing (A) a desired quality for the translation, corresponding to a likely amount of translations that will be required for the received snippet, represented by a score for the snippet determined by pre-translation scorer 346 with (B) the cost required for the translation, corresponding to an amount of processing required for a machine translation engine represented by a quality score for the machine translation engine.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc.

Figure 4:
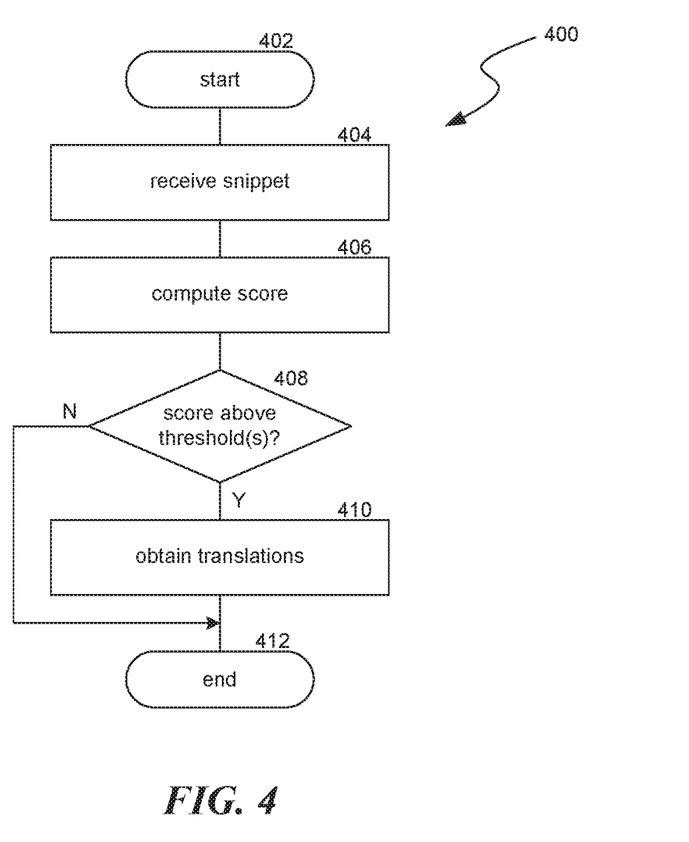
FIG. 4 is a flow diagram illustrating a process used in some implementations for selecting snippets to pre-translate.

FIG. 4 is a flow diagram illustrating a process 400 used in some implementations for selecting snippets to pre-translate. Process 400 begins at block 402 and continues to block 404. At block 404, process 400 can receive a snippet as a potential item for pre-translation. In some implementations, process 400 is performed for a social media website. In various implementations, the snippet can be from a user post to the social media website, a comment on another social media item, a news item, an event, etc. In some implementations where the snippet is from one of multiple comments on another social media item, process 400 can be performed for all comments or for only top ranked comments, which can be comments which are top ranked for all users or for individual users.

At block 406, process 400 can compute a score for the snippet received at block 404. This score can indicate how likely the received snippet is to be translated at least once or translated a threshold amount. This score can be computed by determining translation likelihood factors for the snippet such as snippet author characteristics, user engagement, likely audience, etc.; computing weighting values for the determined translation likelihood factors; and computing a combined score for the snippet using the weighting values. In some implementations, multiple scores can be computed at block 406. For example, process 400 can compute a score corresponding to different potential output languages for the translation of a snippet. Additional details regarding computing a snippet score are provided below in relation to FIG. 5.

At block 408, process 400 can compare the score computed at block 406 with a threshold. In some implementations where different scores are computed at block 406, each score can be compared to the threshold or to a threshold corresponding to each output language. In some implementations, the loop between blocks 408-410 can be repeated for each score computed at block 406.

If at block 408, the score is determined to be less than the threshold, process 400 determines that the snippet received at block 404 will not be pre-translated and continues to block 412. If at block 408, the score is determined to be more than the threshold, process 400 determines that the snippet received at block 404 will be pre-translated and continues to block 410, wherein translations of the snippet can be obtained. Obtaining a translation of the snippet can include selecting a translation method for the snippet based on an estimation of when translations of the snippet will be needed and a balance between translation cost and quality. Based on the timing and quality/cost factors, a translation method can be selected from among one or more human translators or machine translation engines that can perform translations within different timeframes, at different quality levels, and at different costs. Additional details regarding selecting a translation method for a snippet are provided below in relation to FIG. 6.

Process 400 then continues to block 412, where it ends. Process 400 can be performed multiple times for the same snippet as pre-translation likelihood factors change. For example, a snippet can be re-classified to be pre-translated as translation factors change such as the number of users who view or interact with the snippet.

Figure 5:
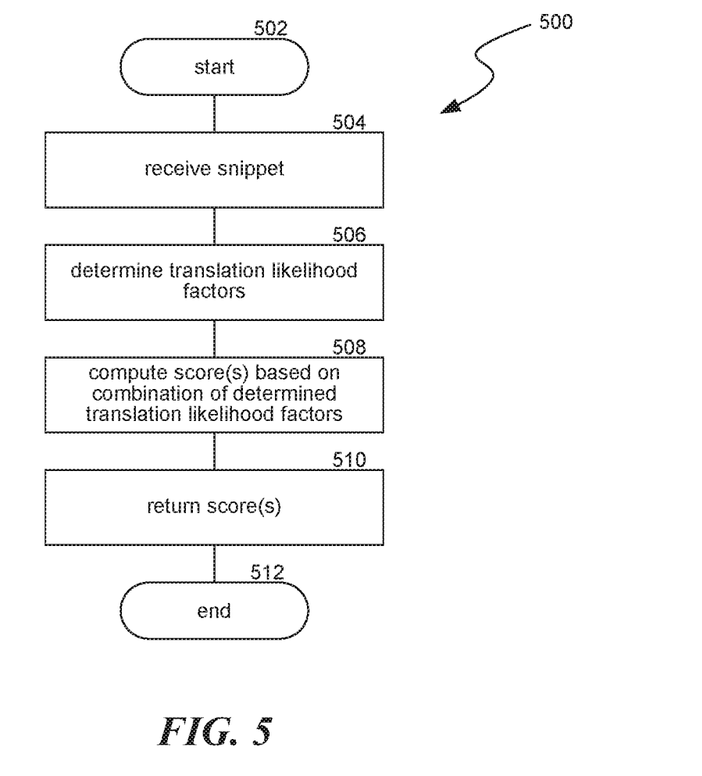
FIG. 5 is a flow diagram illustrating a process used in some implementations for computing a pre-translation score for a selected snippet.

FIG. 5 is a flow diagram illustrating a process 500 used in some implementations for computing a pre-translation score for a selected snippet. Process 500 begins at block 502 and continues to block 504. At block 504, process 500 can receive a snippet. In some implementations, process 500 can be performed as a sub-process of process 400 where the snippet received at block 504 is the snippet received at block 404. In some implementations, process 500 can be performed independently of process 400.

At block 506, process 500 can determine which of several translation likelihood factors apply to the snippet received at block 504. Translation likelihood factors can be factors that indicate how many translations of the snippet will be requested or how urgent it is to perform those translations.

In various implementations, translation likelihood factors can be selected based on: a predefined set of factors to use for computing a translation score, whether information relevant to a translation likelihood factor is available for the receipt snippet, an analysis of the snippet to determine which factors will provide the most accurate translation likelihood scores, etc. In various implementations, translation likelihood factors can include one or more of: characteristics identified for an author of the snippet, characteristics about the content of the snippet, a likely or expected audience of the snippet, user engagement with the snippet thus far, when the snippet was created, snippet source language, snippet rating, a likely amount of time before a translation is needed, a virtual location where the snippet is posted or created, or any combination thereof.

In some implementations, characteristics identified for an author of the snippet can include one or more of: languages an author is identified as being facile with, an author's age, an author's gender, locations associated with an author, technology identified as being used by an author, content items the author has historically viewed or interacted with, occupation of an author, education level of an author, number of friends of an author, friends of an author who speak a language other than the language spoken by the author, etc. In some implementations, characteristics about the content of the snippet can include an identified topic or area of interest of the snippet, whether an identified topic or area of interest of the snippet is trending, snippet length, an language or dialect identified as the source the snippet was written in, types of words or slang used, etc.

In some implementations, a likely audience of the snippet can be determined using historical viewership for snippets with similar topics or areas of interest, similar authors, similar virtual locations where the snippet originated, etc. In some implementations, characteristics of the likely audience can include audience gender, age, location, language, size, job, friends, education level, etc. In some implementations, characteristics of users who have engaged with the snippet thus far can include a total number of users, a total number of translation requests, an amount of time viewed, a number of interactions such as "likes" or "follows," etc. In some implementations, a snippet can receive a rating, based on where in a list of comments the snippet will appear, which can be used to compute the snippet score. The snippet rating can be determined for particular users or for users generally. In some implementations, a likely amount of time before a translation is needed can be based on factors such as when users who are likely to request a translation of the snippet are likely to interact with a system that provides translations of the snippet.

In some implementations, the translation likelihood factors determined at block 506 can be general across all users. In some implementations, the translation likelihood factors determined at block 506 can be specific to a particular user who is expected to request a translation or to a particular type of viewing user. For example, process 500 can be performed for a particular viewing user, and the likelihood factors can be determined in relation to whether it is likely that user will request a translation, such as whether the user is determined to have an interested in a topic identified in the snippet.

In some implementations, process 500 can be performed multiple times for a single snippet for different potential output languages. The determined translation likelihood factors can be different for different output languages. For example, the likely audience in one output language can be different for one output language than for another. As a more specific example, a post to a virtual location associated with escargot can be determined to have a higher audience for a likely French speaking audience than an audience associated with German.

At block 508, process 500 can combine values associated with the translation likelihood factors determined at block 506 to compute a score for the received snippet. In some implementations, a value corresponding to a determined likelihood factor can be a set value for whether that factor applies to a snippet. For example, a binary translation likelihood factor, such as whether there have been at least 100 k views of the snippet, when true, can have a defined value such as 30. In some implementations, a value corresponding to a determined likelihood factor can be a value in a range corresponding to how strongly that factor applies to the received snippet. For example, a translation likelihood factor of friends of a snippet author who speak a language other than the language spoken by the author can be a value in the range between 1 and 100. This value could be, for example, the percentage of the author's friends who speak a language other than the language spoken by the author or a value originated as the total count of this type of author's friends which is normalized into a range. In some implementations, such a value can be computed as a formula. Continuing the previous example, the formula could be ⅓ times the number of friends of the author who speak a language other than the language spoken by the author. So if the number of this type of friend is 45, the value corresponding to this translation likelihood factor can be 15.

In various implementations, the score for the received snippet can be: a sum of the values corresponding to the determined translation likelihood factors, an average of the values corresponding to the determined translation likelihood factors, a modification of a base value where the values corresponding to the determined likelihood translation factors are used as weighting values, or the result of another formula that places different emphasis on different of the values corresponding to the determined translation likelihood factors. At block 510, process 500 can return the score or scores computed at block 508. Process 500 then continues to block 512, where it ends.

Figure 6:
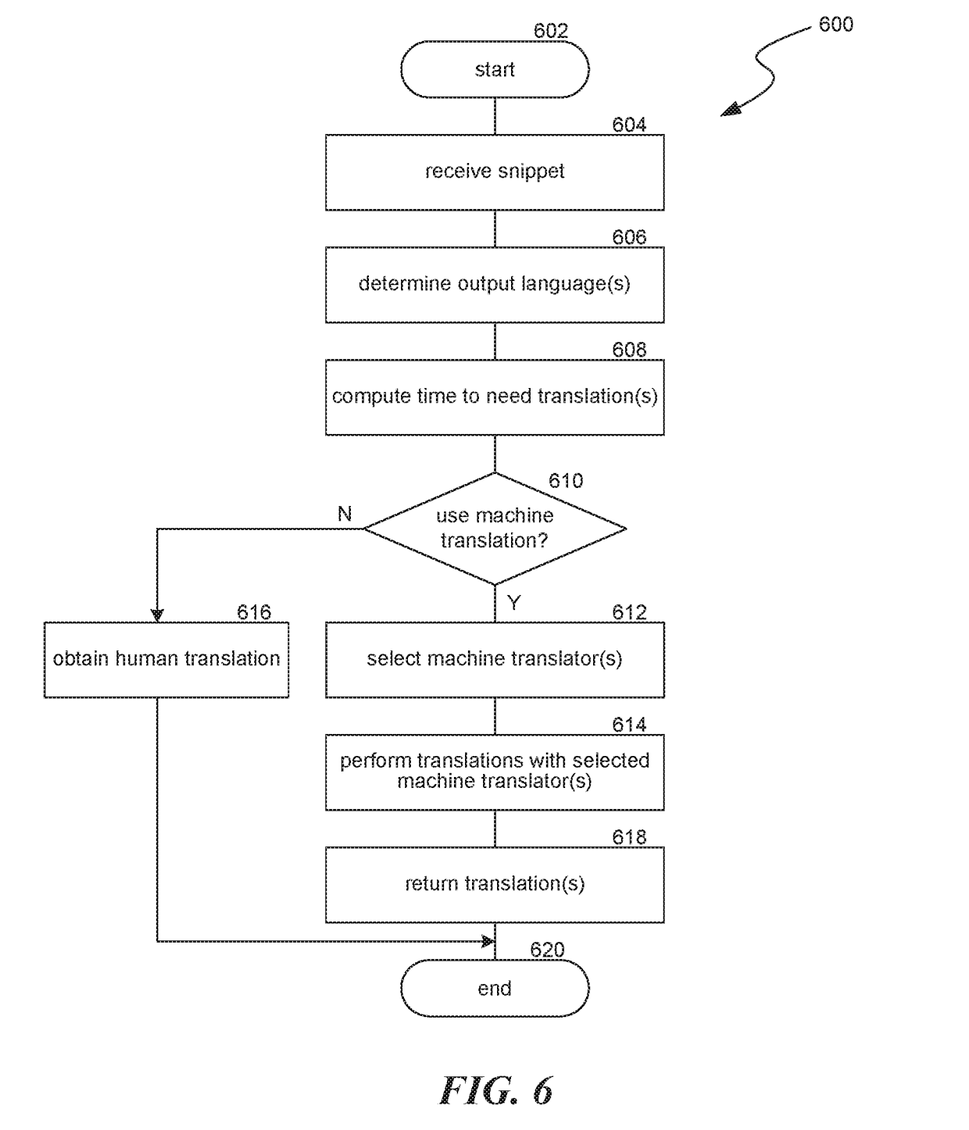
FIG. 6 is a flow diagram illustrating a process used in some implementations for need-based selection of translation methods.

FIG. 6 is a flow diagram illustrating a process 600 used in some implementations for need-based selection of translation methods. Process 600 begins at block 602 and continues to block 604. At block 604, process 600 can receive a snippet. In some implementations, process 600 can be performed as a sub-process of process 400, in which case the snippet received at block 604 is the snippet received at block 404. In some implementations, process 600 can be performed independently of process 400. In some implementations, the received snippet can be associated with a score, such as the score computed at block 406.

At block 606, process 600 can determine an output language or languages for the received snippet. In some implementations, the determined output language can be determined from a translation request. In some implementations, such as where the received snippet is being pre-translated, the output languages can be determined based on a likely audience or can be the output languages for which a score was determined to be above a threshold at block 408.

At block 608, process 600 can compute an expected amount of time remaining before a translation is needed. In various implementations, this amount of time can be an amount of time before a first translation request is expected, an amount of time before a peak number of translation requests are received, or an amount of time before a threshold number of translation requests are received. The expected amount of time computed in block 608 can account for expected translation requests by a determined likely audience. For example, a determined likely audience can be associated with a particular location that typically makes translation requests through a social media system at a particular time of day, e.g., when the workday in that particular location ends, or typically does not use the social media system at other times of day, e.g., when users in this location are typically asleep. In some implementations, the amount of time remaining before a translation is needed can be based on a determined acceptable response time to a translation request. For example, a translation request can have been received 10 ms ago, and a determined acceptable response time for translation requests can be 25 ms; in this example, the computed time before a translation is needed would be 15 ms.

At block 610, process 600 can determine whether to use a machine translation engine to perform a translation of the received snippet. This determination can be based on a comparison between the time amount computed at block 608 and a speed or an expected amount of time required for a human translation of the received snippet, i.e. a "performance metric." In various implementations, the speed or expected amount of time required for human translation can be based on factors such as: historically how much time has been required for human translations to be performed generally, estimates from human translators for how long it will take for translations to be performed, guarantees from human translators to deliver translations within a particular timeframe, a current queue for human translation requests, a current throughput for human translators, a number of currently available human translators, etc. In various implementations, these factors can be for snippets generally or based on snippet length. In various implementations, these factors can be determined for all available human translators or for a subset of human translators that are specialized in a particular topic or area corresponding to a determined topic or area for the received snippet.

In some implementations, the determination of whether to perform a translation using a human translator or a machine translation engine can be based on a quality preference for the translation. In these implementations, various human translators and machine translation engines can be associated with a performance metric including a quality score indicating an expected quality provided by that method of translation. A quality preference for a translation can be based on factors such as an expected amount of translation requests for the snippet; a source of the snippet, i.e., snippets from some sources can be more critical to get correct than others; a topic of the snippet, i.e. a translation provider may have an interested in snippets with particular topics receiving enhanced translations; etc.

Process 600 can perform the determination at block 610 for selecting a translation using a machine translation engine or a human translator by balancing an amount of time before an expected need for the translation expires and a preferred quality (or cost) of translation methods. For example, if a snippet is associated with a high score from block 406, indicating, for example, that the snippet it will receive many translation requests or that the translation is part of a high-traffic webpage, this can indicate that it is worth paying a higher cost for a higher quality translation. This quality/cost can be balanced against a determination that the snippet will be needed very soon and thus should be performed by a lower quality but faster translation system. In some implementations, process 600 can determine that multiple types of translations should be applied for the same snippet. A higher quality translation system can be selected for a final translation of the snippet, but a faster, lower-quality transition system can be applied to respond to translation requests that arrive before the higher quality translation is complete.

If process 600 determines at block 610 that a human translation should be obtained, process 600 continues to block 616. At block 616, process 600 can obtain a human translation of the received snippet. Obtaining a human translation can comprise sending the received snippet to a human translator. In some implementations, a human translator can be selected based on a specialty corresponding to the snippet, such as by topic, author, source language, virtual location.

If process 600 determines at block 610 that a translation should be obtained using a machine translation engine, process 600 continues to block 612. At block 612, process 600 can select a machine translation engine for the received snippet. Similarly to block 610, process 600 can further compare factors such as a number of expected translation requests, a preferred quality for the translation, an expected amount of time before the translation is needed, etc., to select a machine translation engine that has a performance metric indicating it is expected to provide a translation with sufficient quality within an acceptable amount of time. Also as discussed above in relation to block 610, multiple machine translation engines can be selected to provide lower quality quick translations while waiting for higher-quality translations to be completed. In some implementations, multiple machine translation engines can be selected to generate translations in different output languages. In some implementations, block 610 can be combined with block 612 such that distinctions are not made between selecting a human translator or machine translation engine.

At block 614, process 600 can perform translations of the received snippet using the machine translation engines selected at block 612. At block 618, the translations attained at block 614 or at block 616 can be returned. Process 600 then proceeds to block 620 where it ends. Process 600 can be performed multiple times for the same snippet as quality or estimated timing factors change. For example, a snippet can be re-classified for a higher quality translation when a number of users who view or interact with the snippet increases or a topic associated with the snippet is determined to be trending.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, a condition being "expected" or "likely" means that a value has been computed for the condition and the value computed for the condition is above a threshold value. As used herein, a first element is "similar" to a second element by virtue of values being assigned to the first and second elements and a comparison between these values indicates the difference is below a threshold level.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for automatically improving a speed of statistical machine translation, the method comprising:
   receiving a snippet to translate, the snippet comprising a digital representation including one or more words or character groups;
   determining one or more output languages for the translation of the snippet;
   computing an expected amount of time before the translation of the snippet in the one or more output languages will be needed;
   automatically improving statistical machine translation by selecting, from among multiple possible translators, a translator to perform the translation of the snippet, wherein the selecting is based on: (A) a measure of time for the selected translator to perform the translation of the snippet and (B) the expected amount of time; and
   using the selected translator to perform the translation of the snippet into the one or more output languages.

2. The method of claim 1, wherein determining the one or more output languages for the translation is based on a language associated with an expected audience for the translation of the snippet.

3. The method of claim 1, wherein determining the one or more output languages for the translation is based on a request for the translation of the snippet.

4. The method of claim 1, wherein computing the expected amount of time before the translation of the snippet in one or more output languages is needed is based on a determination of an expected audience for the received snippet.

5. The method of claim 4, wherein computing the expected amount of time before the translation of the snippet in one or more output languages is needed is further based on:
   one or more locations associated with the expected audience; and
   a determination of historic times users associated with the one or more locations use a social media system.

6. The method of claim 1, wherein the expected amount of time indicates an amount of time before a first translation request is expected.

7. The method of claim 1, wherein the expected amount of time indicates an amount of time before a threshold amount of translation requests are expected.

8. The method of claim 1, wherein the multiple possible translators include at least one machine translation engine.

9. The method of claim 1, wherein the multiple possible translators include an interface to at least one human translator.

10. The method of claim 1, wherein computing the measure of time for the selected translator to perform the translation of the snippet is based on a length of the snippet.

11. The method of claim 1,
   wherein selecting the translator to perform the translation of the snippet comprises selecting at least two translators from among the multiple possible translators;
   wherein a first of the at least two translators is associated with a first time value and is associated with a first quality value;
   wherein a second of the at least two translators is associated with a second time value and is associated with a second quality value;
   wherein the first time value and the second time value indicate the first of the at least two translators is projected to translate the received snippet faster than the second of the at least two translators;
   wherein the first quality value and the second quality value indicate the first of the at least two translators is projected to generate a lower quality translation than the second of the at least two translators;
   wherein using the selected translator to perform the translation of the snippet comprises using the first of the at least two translators to perform a first translation of the received snippet and using the second of the at least two translators to perform a second translation of the received snippet;
   wherein results of the first translation are used to respond to requests to translate the received snippet until results of the second translation are obtained; and
   wherein, in response to the results of the second translation being obtained, results of the second translation are used to respond to requests to translate the received snippet.

12. The method of claim 1,
wherein determining the one or more output languages for the translation of the snippet comprises determining at least a first output language and a second output language different from the first output language;
wherein computing the expected amount of time before the translation of the snippet is needed comprises computing a first expected amount of time before a first translation in the first output language is needed and computing a second expected amount of time before a second translation in the second output language is needed;
wherein selecting the translator to perform the translation of the snippet comprises selecting a first translator to perform the first translation based on the first expected amount of time and selecting a second translator to perform the second translation based on the second expected amount of time; and
using the selected translator to perform the translation of the snippet comprises performing the first translation using the first translator and performing the second translation using the second translator.

13. The method of claim 1 further comprising, prior to receiving the snippet to translate, selecting the snippet for pre-translation by:
computing a pre-translation score for the snippet by:
selecting translation likelihood factors for the snippet, wherein the selected translation likelihood factors are associated with corresponding likelihood scores, the corresponding likelihood scores computed as an estimation of an effect the corresponding translation likelihood factor will have on an amount of translations or time of translation of the snippet; and
computing, as the pre-translation score, a combination of the likelihood scores corresponding to the selected translation likelihood factors;
determining that the pre-translation score is above a threshold; and
in response to determining that the pre-translation score is above the threshold, identifying the snippet as a snippet that will be pre-translated.

14. A system for automatically improving a speed of machine translation, the system comprising:
one or more processors;
a memory;
an interface configured to receive a snippet to translate, the snippet comprising a digital representation including one or more words or character groups;
a translation timer configured to compute an expected amount of time before a translation of the snippet will be needed; and
a translator selector configured to automatically improve the speed of machine translation by selecting a translator to perform the translation of the snippet from among two or more translators,
wherein the selecting is based on: (A) a measure of time for the selected translator to perform the translation of the snippet and (B) the expected amount of time;
wherein the selected translator is used to perform the translation of the snippet.

15. The system of claim 14, wherein the translation timer is configured to compute the expected amount of time before the translation of the snippet is needed based on:
a determination of an expected audience for the received snippet;
one or more locations associated with the expected audience; and
a determination of historic times users associated with the one or more locations use a social media system.

16. The system of claim 14, wherein the two or more translators comprise:
an interface to at least one human translator; and
at least one machine translation engine.

17. The system of claim 14, wherein the translator selector is configured to compute the measure of time for the selected translator to perform the translation of the snippet based on a length of the snippet.

18. A computer-readable storage medium storing instructions that, when executed by a computing system, cause the computing system to perform operations for automatically improving translation speed, the operations comprising:
receiving comprising one or more words or character groups;
computing an expected amount of time before a translation of the snippet will be needed;
automatically improving translation speed by selecting, from among multiple possible translators, a translator to perform the translation of the snippet,
wherein the selecting is based on: (A) a measure of time for the selected translator to perform the translation of the snippet and (B) the expected amount of time; and
using the selected translator to perform the translation of the snippet into one or more output languages.

19. The computer-readable storage medium of claim 18, wherein computing the expected amount of time before the translation of the snippet is needed is based on:
a determination of an expected audience for the received snippet;
one or more locations associated with the expected audience; and
a determination of historic times users associated with the one or more locations use a social media system.

20. The computer-readable storage medium of claim 18, wherein the multiple possible translators comprise:
an interface to at least one human translator; and
at least one machine translation engine.

* * * * *